US008768879B2

(12) United States Patent
Phillips et al.

(10) Patent No.: US 8,768,879 B2
(45) Date of Patent: Jul. 1, 2014

(54) METHOD OF STORING AND ANALYSING DATA PRODUCED FROM INTERACTIONS BETWEEN EXTERNAL AGENTS AND A SYSTEM

(75) Inventors: Alan Paul Rolleston Phillips, Aynho (GB); John Graham-Cumming, London (GB); Gareth O'Loughlin, London (GB); Jason Derek McFall, London (GB); Paul David Mellor, Hildenborough (GB); Neil Samuel Ferguson, London (GB); Alfredo Ramos-Alvarez, Shepperton (GB); Liam Philip Clancy, London (GB); Fiann James Curry-Towneley-O'Hagan, Godney Wells (GB); Andrew Galloni, London (GB); Steven Heron, Brighton (GB); Maciej Buczkowski, London (GB); Panagiotis Belesis, London (GB); Benjamin Thomas Pickering, London (GB)

(73) Assignee: Nice Systems Technologies UK Limited, Southampton (GB)

( * ) Notice: Subject to any disclaimer, the term of this patent is extended or adjusted under 35 U.S.C. 154(b) by 248 days.

(21) Appl. No.: 13/012,749

(22) Filed: Jan. 24, 2011

(65) Prior Publication Data

US 2011/0184905 A1 Jul. 28, 2011

(30) Foreign Application Priority Data

Jan. 22, 2010 (GB) .................................. 1001041.1

(51) Int. Cl.
*G06F 7/00* (2006.01)
*G06F 17/00* (2006.01)

(52) U.S. Cl.
USPC ......................................................... 707/602

(58) Field of Classification Search
USPC ................................................. 707/602, 784
See application file for complete search history.

(56) References Cited

U.S. PATENT DOCUMENTS

| | | | |
|---|---|---|---|
| 2005/0108383 A1* | 5/2005 | DeHaas et al. | 709/224 |
| 2006/0230058 A1* | 10/2006 | Morris | 707/102 |
| 2007/0006163 A1* | 1/2007 | Aoki et al. | 717/127 |
| 2008/0214157 A1* | 9/2008 | Ramer et al. | 455/414.1 |
| 2009/0094294 A1* | 4/2009 | Morris et al. | 707/202 |

FOREIGN PATENT DOCUMENTS

WO   WO 2004/097643   11/2004

OTHER PUBLICATIONS

Nievergelt J et al. "The Grid File: An Adaptable, Symmetric Multikey File Structure" ACM Transactions on Database Systems, ACM, New York, NY, US vol. 9, No. 1, Mar. 1, 1984.
"DB2 Information Center—Multidimensional Clustering" Jan. 1, 2002 pp. 1-10 Retrieved from the Internet:URL:http://webdocs.caspur.it/ibm/db2/8.1/doc/htmlcd/en_us/index.htm?openup=admin/c0007201.htm [retrieved on Aug. 29, 2011].
Vijayshankar Raman: "Locality preserving dictionaries" Proceedings of the Eighteenth ACM Signod-Sigact-Sigart Symposium on Principles of Database Systems, PODS '99, Jan. 1, 1999 pp. 337-345 New York, NY, US.
Nc:"Planning and Creating Indexes" Microsoft TechNet, Jul. 19, 2001 pp. 1-23 Retrieved from the Internet: URL:http://technet.microsoft.com/en-us/library/cc917624%28d=printer%29.aspx [retrieved on Aug. 30, 2011].

* cited by examiner

*Primary Examiner* — Alexey Shmatov
(74) *Attorney, Agent, or Firm* — Pearl Cohen Zedek Latzer Baratz LLP

(57) ABSTRACT

Methods of storing data records produced from monitoring interactions between external agents and a system are described. The method defines specific interactions that occur between the external agents and the system as events of interest. A chain of interactions occurring during respective interaction sessions between a respective external agent and the system are monitored and events of interest occurring in the chain are determined. Data records from the monitored chain are produced, the respective data record including data identifying determined events of interest and data associated therewith. A profile identity, representative of the external agent, is assigned to each data record produced during an interaction session. Data records of individual events of interest are stored in a way ordered according to the type of event of interest and data records of events of interest occurring during an interaction session are stored in a way ordered according to assigned profile identity.

3 Claims, No Drawings

METHOD OF STORING AND ANALYSING DATA PRODUCED FROM INTERACTIONS BETWEEN EXTERNAL AGENTS AND A SYSTEM

CROSS-REFERENCE TO RELATED APPLICATIONS

The present application claims the benefit of UK Patent Application No. 1001041.1 filed Jan. 22, 2010, which is incorporated herein by reference in its entirety.

TECHNICAL FIELD

The present invention relates to a method of storing and analysing data produced from interactions between external agents and a system.

BACKGROUND

In any dynamic system, interactions occur between external agents and the system. There are many examples of this, such as humans, as external agents, interacting with the ecological system of the planet, humans interacting with a traffic management system, humans interacting with the Internet and so on.

The way external agents interact with systems is a great source of interest since the systems are typically of technical, economic or commercial value. By looking at the chain or stream of interactions that can occur between the individual external agents and the system in question, and in particular by looking at particular events of interest in that chain, it is possible to model the behaviour of the external agents and/or the effects on the system and take decisions regarding changes to or operation of the system. In this way, it is possible to learn the relationship between cause and effect, with analytical models of past interactions being built and then predictive models applied to drive future decision making.

In order to study the effects that are happening consequent to the interactions occurring between the external agents and the system, and to study the behaviour of both the external agent and the system as mentioned above, the interactions that are occurring need to be monitored and the data on the interactions recorded and stored for analysis.

One problem with this is that huge volumes of data need to be stored. Another problem is that the huge volumes of data need to be accessible and retrievable by a query in a manner that facilitates analysis in a useful and time effective manner. Yet another problem is that during the interactions occurring between the external agents and a system, it is not known at that time which of those interactions may result in an event of interest that is deemed important or significant for subsequent analysis. Thus, the storage and retrieval of the data must be flexible so that the analysis can take place around differing and subsequently selected events of interest amongst the plurality of potential events of interest in the chain of interactions occurring, and all in a reasonable time frame and within the current constraints on computer processing power.

The memory capacity that is available today facilitates the storage of vast amounts of data and it is now possible to monitor and store data concerning many interactions. However, whilst memory capacity continues to grow apace, the speed of access to and the ability to query, retrieve and analyse that data lags far behind. There is therefore a need to find improvements in the way that the vast amounts of data are stored for retrieval and analysis in order that useful information can be available within reasonable time constraints.

It is an object of the present invention to provide a method of storing and analysing data whereby large amounts of data can be monitored and stored in a manner enabling versatile and flexible analysis of the data without recourse to centralised massive computing power.

BRIEF SUMMARY

According to one aspect of the present invention there is provided a method of storing data records produced from monitoring interactions between external agents and a system, the method comprising:— defining specific interactions that can occur between the external agents and the system as potential events of interest;

monitoring a chain of interactions occurring during respective interaction sessions between a respective external agent and the system and determining potential events of interest occurring in the said chain;

producing data records from the monitored chain of interactions, the respective data record including data identifying determined potential events of interest and data associated therewith;

assigning a profile identity, representative of the external agent, to each data record produced during a said interaction session;

storing data records of individual potential events of interest in a way that is ordered according to the type of potential event of interest and storing data records of potential events of interest occurring during an interaction session in a way that is ordered according to assigned profile identity.

According to another aspect of the present invention there is provided a method of analysing data records produced from monitoring interactions between external agents and a system, the method comprising:— defining specific interactions that can occur between the external agents and the system as potential events of interest;

monitoring a chain of interactions occurring during respective interaction sessions between a respective external agent and the system and determining potential events of interest occurring in the said chain;

producing data records from the monitored chain of interactions, the respective data record including data identifying determined potential events of interest and the timing thereof, and data associated therewith;

assigning a profile identity, representative of the external agent, to each data record produced during a said interaction session;

storing individual data records on a storage device;

selecting a said potential event of interest as an actual event of interest;

querying and retrieving from the stored data records those data records containing a potential event of interest corresponding to said selected event of interest; and constructing, from the data of the retrieved data records, a scenario record of the actual event of interest which includes data of interactions associated therewith and which uses the time of the actual event of interest as an origin for ordering the data in the scenario record.

According to still another aspect of the present invention there is provided a method of storing data records produced from monitoring interactions between external agents and a system, the method comprising:— defining specific interactions that can occur between the external agents and the system as potential events of interest;

monitoring a chain of interactions occurring during respective interaction sessions between a respective external agent and the system and determining potential events of interest occurring in the said chain;

producing data records from the monitored chain of interactions, the respective data record including data identifying determined potential events of interest and data associated therewith;

assigning a profile identity, representative of the external agent, to each data record produced during a said interaction session;

assigning a plurality of dispersed storage devices to store said data records;

storing data records around the plurality of dispersed storage devices in an unbiased manner, wherein data records of a said profile identity are stored on a common storage device and the data records of individual potential events of interest are stored in a first section of a part of a said storage device in a way that is ordered according to the type of potential event of interest, and the data records of potential events of interest occurring during an interaction session are stored in a second section of said part in a way that is ordered according to assigned profile identity.

According to yet another aspect of the present invention there is provided a method of analysing data records produced from monitoring interactions between external agents and a system, the method comprising:— defining specific interactions that can occur between the external agents and the system as potential events of interest;

monitoring a chain of interactions occurring during respective interaction sessions between a respective external agent and the system and determining potential events of interest occurring in the said chain;

producing data records from the monitored chain of interactions, the respective data record including data identifying determined potential events of interest and data associated therewith;

assigning a profile identity, representative of the external agent, to each data record produced during a said interaction session;

assigning a plurality of dispersed storage devices to store said data records;

storing data records around the plurality of dispersed storage devices in an unbiased manner, wherein data records of a said profile identity are stored on a common storage device and wherein the data records of individual potential events of interest are stored in a way that is ordered according to the type of potential event of interest, and wherein the data records of potential events of interest occurring during an interaction session are stored in a way that is ordered according to assigned profile identity;

selecting a said potential event of interest as an actual event of interest;

accessing the plurality of dispersed storage devices at the same time and querying and retrieving from the stored data records thereon those data records containing a potential event of interest corresponding to said selected actual event of interest; and constructing, from the data of the retrieved data records, a scenario record of the actual event of interest which includes data of interactions associated therewith.

According to still another aspect of the present invention there is provided a method of analysing data records produced from monitoring interactions between external agents and a system, the method comprising:— defining specific interactions that can occur between the external agents and the system as potential events of interest;

monitoring a chain of interactions occurring during respective interaction sessions between a respective external agent and the system and determining potential events of interest occurring in the said chain;

producing data records from the monitored chain of interactions, the respective data record including data identifying determined potential events of interest and data associated therewith;

assigning a profile identity, representative of the external agent, to each data record produced during a said interaction session together with a confidence parameter representative of the certainty of the identity of the external agent involved in the potential event of interest;

storing data records of individual potential events of interest in a first store in a way that is ordered according to the type of potential event of interest and storing data records of potential events of interest occurring during an interaction session in a second store in a way that is ordered according to assigned profile identity.

selecting a said potential event of interest as an actual event of interest and selecting a confidence interrogation parameter for the confidence parameter;

querying and retrieving from the stored data records those data records where the confidence parameter satisfies the confidence interrogation parameter and contains a potential event of interest corresponding to said selected actual event of interest; and constructing, from the data of the retrieved data records, a scenario record of the actual event of interest which includes data of interactions associated therewith.

Examples of the present invention will now be described below.

DETAILED DESCRIPTION

The present invention concerns interactions that occur between respective external agents and a system. These interactions can take a plurality of different forms and the systems with which the external agents interact can take many forms. In addition, the interactions that can occur can take place in different channels or forms. Moreover, the eventual interaction that is to be selected to be of interest in any later analysis is not necessarily readily apparent. Thus, it is not clear at the time the interaction is taking place whether that interaction is going to be of interest in later analysis and will need to be selected as an interaction of interest.

Consequently, large numbers of interactions need to be monitored and the data from the interactions needs to be stored in a highly flexible way and in a manner that allows the information to be accessed and useful information retrieved once an interaction is selected to be of interest out of the range of interactions that have occurred and are potentially of interest.

In this respect, to provide versatility and useful input for models, it is desirable for analysis to be able to construct, for each external agent, a profile scenario record which includes the following data:— a history of the interactions of the external agent which led up to a specific selected event of interest in the chain of interactions event stream, the state of the external agent and any contextual information at the time of the selected event of interest, and a description of the interactions which followed the selected event of interest so as to capture the outcomes and consequences that may have arisen from the selected event of interest.

It will be noted that it is also desirable for such scenario records to be constructed for chains of interactions that have occurred during different interaction sessions between the respective external agent and the system, and for analysis to take place between difference interaction sessions.

Thus, the complication with storing such data is that when it comes to building the profile scenario record for any external agent, as defined by a specified analytical query of the data, the profile scenario record must be able to be built from the data about any arbitrary type of interaction event of interest which is selected to be the event of interest. Thus, events of interest occurring in the chain of interactions are all potential events of interest in that any one of them could be selected to be the actual event of interest.

Moreover, as the event of interest can in principle be any interaction in the chain of interactions, it is not feasible to maintain the variables of any one external agent as rolling values, they must be able to be computed on demand once the selected event of interest has been located in the data for that external agent.

A further complication is that the analytical query defining how the profile scenario record is constructed may not define the selected event of interest as the sole variable. In this respect, the selected event of interest may need to be identified not only on the details of the event itself but also on some detail of the behaviour of the external agent.

In order to clearly convey the concepts of the present invention to the reader, the description hereinafter will be directed towards interactions that humans, as external agents, have with the Internet, as the system. The description has been directed in this manner purely to assist in understanding of the invention and the present invention is not limited to just such external agents and/or just such a system.

With the present invention, when a respective individual external agent (a human) interacts with a system (a selling system), a number of interactions will take place during an interaction session. In order to provide useful data for later use, the present invention defines specific interactions that can occur as potential events of interest. These potential events of interest can be events that can only occur within one type of interaction channel between the external agent and the system (e.g. the Internet) or can by events that can also occur in other interaction channels (e.g. in a retail store, ATM machine, call centre, mobile app, email, direct mail etc). By way of example only and in the context of humans interacting with the Internet, such potential events of interest could be defined to be:— visit a page
authentication of identity
logout
page view
checkout
product purchase
product view
product cart add
product cart remove
product cart abandon
site search
site search clickthrough
add product to wishlist
remove product from wishlist
account signup
update personal details
category browse
category browse clickthrough
submit location
sign up for loyalty card
purchase return
product return Thus, an interaction session will have a chain of plural interactions that the external agent has with the system. It will be appreciated that the external agent (the human) can interact with the system multiple times and through different channels. Thus, the same external agent can have plural interaction sessions.

The present invention monitors the interactions that occur between an external agent and a system and determines potential events of interest occurring in that chain. Other events occurring in that chain may not be potential events of interest but may contain data relating to the potential event of interest, the data defining one or more attributes associated with a particular potential event of interest. It will be apparent that the definition of the potential event of interest can be varied according to the external agent and system involved and the proposed analysis thereof.

It will be apparent that a large number of data records and a large volume of data will be produced. The problem with this is that the data must be stored and be available for access, retrieval and analysis in a useful and time effective manner. This problem is compounded by the fact that, as indicated above, prior to any analysis of the data records the potential event of interest that is going to be the actual event of interest is not known.

With the present invention, the data records are stored in a particular way so that the data records associated with potential events of interest can accessed in a manner enabling analysis to be conducted in a reasonable time frame.

As the chain of interactions occur, which include potential events of interest, and are monitored, the data therefrom is stored in two different ways.

Firstly, when a defined specific potential event of interest is monitored as occurring between an external agent and the system during an interaction session, then data about that potential event of interest is incorporated into a data record including an indicator of the potential event of interest and any data defining certain attributes associated with that particular potential event of interest. In addition, that data record is assigned a profile identity (Profile ID) associated with the external agent.

Thus, when a chain of interactions is monitored during an interaction session, a plurality of data records is produced with the respective data record including the following fields, by way of example:—

Event ID,
Event Type,
Timestamp,
Profile ID,
Authentication Upgrade Rule,
{Attribute Type, Attribute Value}, {Attribute Type, Attribute Value} . . . .

These data records are stored to a storage device in an Index Store as a set of B-Tree indexes on the following fields (in this order):—

Event Type,
Attribute Type,
Attribute Value,
Profile ID

The B-Tree indexes are clustered on the fields in the Index Store. In other words the data record is physically stored on a storage device ordered by Event Type (potential event of interest), then within each Event Type by Attribute Type, then within each Attribute Type by Attribute Value, then within Each Attribute Value by Profile ID. The other fields mentioned here will be described below.

Thus, when the time comes to analyse all the data records in the Index Store it is possible to select and hence specify in a query a particular potential event of interest as the actual event of interest and in this way access and retrieve from the Index Store all of the Profile IDs that have had that actual event of interest occur.

Indeed, such a query can also specify a particular attribute type of and/or attribute value associated with the actual event of interest thereby filtering the data records in a more focussed manner. It will be appreciated that by storing all of the data records ordered by Event Type, the data that is needed during a query is stored close together on the storage device thereby minimising the number of random reads required to retrieve it. By having the Profile ID as a field in the Index Store, the results can be sorted by Profile ID when performing a query for a specified actual event of interest, attribute type, and attribute value.

Secondly, when a defined specific potential event of interest is monitored as occurring between an external agent and the system during an interaction session, then data about that potential interaction of interest is incorporated into a data record including an indicator of the potential event of interest and any data defining certain attributes associated with that particular potential event of interest. This data record may include data relating to one or more potential events of interest. In addition, that data record is assigned a profile identity (Profile ID) associated with the external agent.

These data records are stored to a storage device in an Event Store ordered by Profile ID. In this way, the complete set of data records of potential events of interest for a particular Profile ID are stored close together on the storage device.

It will be appreciated that by grouping the potential events of interest by Profile ID on the storage device, it is possible to minimise the seek time and random reads of the storage device when the time comes to retrieve all of the potential events of interest for particular Profile IDs, which are supplied as a result of the aforementioned query of the Index Store. This is significant because analysis of potential events of interest, and the associated particular Profile ID, typically includes interest in all or most of the potential events of interest for that Profile ID. Moreover, this makes it possible to construct a profile scenario record which can include a history of the interactions which led up to the actual event of interest, contextual information at the time of the actual event of interest, and a description of the interactions which followed the actual event of interest.

Thus, data records of individual potential events of interest are stored in the Index Store in a way that is ordered according to the type of potential interaction event of interest. Consequently, the query of the Index Store results in an ordered set of Profile IDs being retrieved from the Index Store.

Individual data records of potential events of interest, or blocks thereof, occurring during an interaction session are stored in the Event Store in a way that is ordered according to assigned profile identity. By storing in the Event Store the potential events of interest in Profile ID order, all of the potential events of interest for those Profile IDs can be retrieved, according to the ordered set of Profile IDs retrieved from the Index Store, while minimising seek time of the storage device. This speeds up the overall processing time of the query.

One aspect of the present invention provides a method of analysing the data records. In this respect, the data records produced from the monitored chain of interactions includes not only data identifying determined potential events of interest but also the timing thereof. When the data records are to be analysed, it is possible to choose and select, at a later point in time, a particular potential event of interest as an actual event of interest. Having done this, the stored data records can be queried and those records containing a potential event of interest corresponding to the actual event of interest can be retrieved. It is then possible to construct, from the data of the retrieved data records, a scenario record of the actual event of interest which includes data of interactions associated therewith and which uses the time of the actual event of interest as an origin for ordering the data in the scenario record.

Thus, by having timing as part of the data record, it is possible to cleanly partition the data for an external agent into data before and after the selected actual event of interest so that an understanding of the causal relationships between the two can be obtained, bearing in mind that the actual event of interest is only known historically and can be chosen to be any potential event of interest in the overall interaction event stream.

In particular, when it comes to building the profile scenario record as defined by an analytical query, it is necessary to initially be able to identify the selected actual event of interest from the data for the external agent, and then aggregate, around the time of the actual event of interest, those events of interest which are identified as belonging to the same external agent and do so in a manner which can provide descriptors that characterise the behaviour of the external agent and describe the causes and effects of the selected actual event of interest.

With this aspect of the invention the data can be analysed according to a time range in which matching actual events of interest must have occurred to satisfy the query, regardless of when precisely the actual event of interest took place.

For example, in the case of humans (as the external agents) using the Internet (the system) to purchase goods, say a TV, it is possible to action a query to retrieve data for all customers (Profile IDs) who viewed a TV and purchased a TV in the last three months (the actual event of interest) and to construct a scenario record from the retrieved data. In this respect, the interactions of a particular Profile ID can be aggregated into a profile scenario record (a customer record) around the actual event of interest (a fulcrum event), which is the event where the customer performed some action of interest.

The interactions of a Profile ID can be divided into periods of time relative to the fulcrum event time, some going back in time from the fulcrum point and some forward in time. In this way, it is possible to compare on the same time scales the data records of all customers who performed the actual event of interest even though the actual point in time where the customers performed that actual event of interest will vary. By aligning each profile scenario record around the time of the actual event of interest, the behaviour of a variety of customers before and after that actual event can be compared. This principle can be applied to the interactions of any external agent interacting with any system and is not limited to the above Internet example.

For an analysis of causality of the ordering of potential events of interest, it can be important to extract those customers (Profile ID) who viewed a TV and then purchased a TV (but not necessarily at the same time). This is possible by including in the query of the data records a second clause relative to the first, which may or may not have an absolute time restriction. For example, it is possible to specify that interactions matching the second clause (the purchase) must then have happened within a specified time frame of the first clause (the viewing) for that customer to satisfy the query bearing in mind that the viewing of the TV may be just one potential event of interest in the interactions with the system during an interaction session between that customer and the system. Thus, when constructing a scenario record it is possible to focus on those records which meet both the first and second clause and specify the time frame for aggregating the scenario record around the actual event of interest.

In this respect, a variable can be defined in terms of the event of interests and attributes that contribute to it, as well as an aggregation function that combines the individual events and attributes to compute the variable's value. When querying, filters can be applied based on the value of a variable in a certain time period. For example, the data records can be queried to find customers who have spent more than $1000 in the week following a certain event. Since the system knows what events and attributes contribute to a particular Variable, it can retrieve only those data records from the Index Store, and apply the aggregation function to turn them into a variable value. Customers who do not meet the variable filter criteria are then excluded from the results, and no other events for that customer are retrieved.

It will also be noted that in this way it is possible to extract data records which satisfy the query but which data records reflect interactions between the customer and the system using different interaction channels such as the Internet, a retail store, ATM machine, call centre, mobile app, email, direct mail etc.

The time frame may be specified in relative time (e.g. Ain the week before@, Awithin the next month@, etc) or relative activity (e.g. Ain the previous interaction session with the system@, or Alater in the same interaction session@). Queries can be constructed having chains of relative time to express complex sequences of events such as 'viewed a TV in December, purchased a TV within the following session, returned a TV within a week of purchasing a TV etc.

It will be appreciated that in this way the analysis of the data records can be split into three time categories:—

A) Absolute periods of time that are relative to the current system time and not the fulcrum point (and hence are the same for each profile scenario record that is built). Examples of these include 'current month' and 'last quarter'.

B) Relative periods of time framed relative to the fulcrum point. Relative time intervals are entirely in either the past or future relative to the fulcrum point and hence contain interactions that occurred in some period of time either immediately before or immediately after the fulcrum event. All relative time intervals in the past overlap, as do all future time intervals. As the duration of the interval increases, the information contained within the interval is much less granular.

C) Relative activity intervals are similar to relative time intervals, but the intervals are not a fixed duration of time but are instead some period of activity, such as an interaction session. As the customer scenario records are on the same time scales and aligned around the same point, using a comparison of previous session behaviour means that the actual time of that previous session behaviour is unimportant.

By producing data records in this way, it is possible to provide the facility for complex interrogation of the data records enabling sophisticated analysis of interactions and potential interactions of interest.

The granularity of the time interval can be selected to depend on the typical granularity of the analytical queries that are made of the data records. Thus, if most queries specify time intervals at a granularity of months, then the potential events of interest are split into time intervals according to the month in which they occurred. Consequently, a query of the data records does not have to scan through data for a date range that it is not interested in. Thus, if a query wants only the data for a specific month it only has to scan through the data records for that month to execute the query.

In this way, it is possible to minimise random reads and the overall seek time of the storage device. This speeds up the processing of the query.

In one aspect of the present invention, a plurality of dispersed storage devices are used to store the data records. As explained above, data records are stored to an Index Store and an Event Store. In this case, the data records are stored around the plurality of dispersed storage devices in an unbiased manner, with the data records of an assigned profile identity being stored on a common storage device.

Thus, the Index Store and the Event Store of a respective Profile ID is located on a common storage device, which is selected in an unbiased manner such as random, and which is assigned to that Profile ID.

The actual location of the Index Store and Event Store of any one Profile ID amongst the dispersed storage devices is known since a database maintains information regarding which storage device stores the data records for any particular Profile ID.

There are a number of advantages to storing the data in the above way.

By having the data provided on a number of different storage devices, which can be virtual as well as physical, the storage devices can be located in a variety of dispersed places. In addition, each of those separate devices is typically tied to localised processors and hence can be accessed by the respective local processor to that storage device. Thus, scenario records can be constructed without the requirement of centralised massive computing power.

Moreover, by storing the data of a Profile ID on a common storage device of a plurality of dispersed storage devices, the plurality of dispersed storage devices can be accessed at the same time (in parallel) and the stored data records thereon queried. This enables the large amounts of data to be processed at the same time according to the analytical query. Thus, scenario records can be constructed in a reasonable time frame.

In addition, since the query of each storage device is independent, a stream of results sorted by Profile ID can be returned over time across the entire data set. Without having the data records disbursed amongst a plurality of dispersed storage devices, a complete query of the data across the entire set would need to be produced before starting to return results. This, parallel access and processing of the data according to the analytical query enables a continual stream of individual results to be fed back to the source of the query in a stream which enables results of the query to be returned to the source of the query as soon as they are available, and an overall result of the query to be built up over time with ever greater confidence as more individual results are fed back.

In one aspect of the present invention, the data records of individual potential events of interest are stored in a first section of a part of one storage device in a way that is ordered according to the type of potential event of interest, and the data records of potential events of interest occurring during an interaction session are stored in a second section of that part in a way that is ordered according to assigned profile identity.

Thus, the selected storage device is split or partitioned into a number of storage partitions and the Index Store and Event Store of one Profile ID is located at one of those storage partitions. Each storage device contains an index which maps Profile IDs to the storage partition on the storage device at which the interaction event data for that Profile ID are stored.

This further improves the speed of return of the stream of results sorted by Profile ID. Results of the analysed data can be produced immediately from the analytical query as each storage partition is accessed with the results streaming in as further storage partitions are accessed and as this process continues in parallel on differing storage devices. The time to when a first result is returned can be adjusted by varying the number of partitions that are queried at one go, selecting more partitions sacrifices throughput since each partition requires at least one more random read from the storage device (and possibly multiple random reads).

In many systems, the external agents interacting with the system during an interaction session may have either a known identity or an unknown identity or which becomes an unknown identity or known identity respectively through some interaction that occurs with the system.

Thus, in a further aspect of the present invention the Event Stores are further classified into An Identified Event Store and An Anonymous Event Store, the former being for storing data of interactions with the system where the Profile ID corresponds to a known external agent, the latter being for storing data of interactions with the system where the Profile ID corresponds to an unknown external agent. In each case, the external agent is still assigned a Profile ID and the data stored accordingly regardless of whether the external agent is known or unknown.

With this aspect of the present invention a profile identity, representative of the external agent, is assigned to each data record produced during an interaction session together with a confidence parameter representative of the certainty of the identity of the external agent involved in the potential event of interest. The confidence parameter can be a ranking according to a confidence in the identity of the external agent. In this way it is possible to manage the identity of the external agents and analyse the data records taking into account the confidence in the identity.

Thus, in a query, there can be a trade off between only including data where one is confident that it pertains to a particular external agent, and including as much useful data as possible, it is analogous to signal/noise optimisation.

Generally speaking, when an external agent has interactions with the system, there is an identifier of the equipment being used which provides an identifier link of the external agent with the system, for example, a tracking cookie in a user's web browser, a vehicle number plate, etc. Unless the real identity of the external agent is known, then all data that is associated with the same identifier link is assigned the same (anonymous) Profile ID which is stored in the Anonymous Event Store.

If the identity of the user of the equipment is known, for example, from a result of an interaction with the system, then all data is assigned to the same (identified) Profile ID which is stored in an Identified Event Store.

There are many ways to verify an external agent so that it is an Identified Profile ID. For example, it can be mapped to differing attributes of the external agent such as their email address, username, finger print etc.

In addition, the interaction itself can be correlated with certain actions that occur in relation to the interaction. In this respect, an interaction session refers to an interval of interactions with the system by a specific Profile ID without a gap of more than a certain amount of time between potential events of interest (typically 30 minutes).

In relation to this, an Identification Event is defined as an event which occurs in an interaction session which provides the identity of the external agent (for example, somebody enters their email address on a website). In effect, an interaction occurs with the system such that the system obtains some information that can be mapped to an Identified Profile ID. Thus, the events in this interaction session can then be marked as identified.

In an analogous manner, a De-Identification Event can occur when an external agent specifically tells the system that they are not actually the external agent that the system had previously expected, for example, a human goes to a website, sees the message "Welcome Joe", and clicks a link that says "I am not Joe"). A De-Identification Event can also be implicit in other activities, for example, the end of an interaction session may implicitly be a De-Identification event, but does not have to be.

An Authentication Event is a special type of interaction that verifies the identity of the external agent, for example, a user on a website logs in with their username and password.

A De-Authentication Event is any event that ends an authenticated interaction session (for example, the same customer logs out from the website).

The reason to do this is because a company may have many interaction channels and may wish to join up customer data across these channels, but has to accept that this will be an imperfect process. By assigning a confidence parameter, a decision can be taken on the confidence parameter at the stage of querying the data records.

For example, a customer may shop online and pay by credit card, after authenticating with a password, so there is a high confidence that these online purchases are made by that customer. If that customer also uses the same credit card in a shop, there is again a reasonably high confidence that it is also the same customer. However, if that customer pays by cash in a shop, it is much harder to be sure that it is that customer making the purchase and so the interaction has a lower confidence parameter.

In another example, the customer may use a loyalty card which identifies the customer, but their spouse may also share the loyalty card. Thus, a lower confidence level is assigned to the profile identity. In still another example a customer may ask for purchases to be delivered to that customer=s address. However, the mere delivery to that address may be made by someone else in the same household, or it could be a friend sending the customer me a gift.

In a similar vein, if a customer phones a call centre, then there is a high degree of confidence that the system (the company) will accept that the customer is who they say there are. However, they may ask challenge questions (what is my address, date of birth, mother's maiden name, etc.) in order to increase the confidence parameter.

The activity that accompanies the interaction may determine the confidence parameter. For example, some web sites assume that you are the same user when you visit the site from a common computer, unless you notify otherwise. This is fine for something relatively risk-free, such as recommending products, for example a customer is recommended a product based on their partners purchases. However, for systems which rely heavily on trust, for example banks, customers are rightly very careful to avoid anyone else accessing their bank account, and if the bank seems to confuse them with someone else, by incorrectly attributing activities or interests to them, this risks making them lose confidence in the bank's security. Precise knowledge is important to if a bank wants to make a concrete offer such as a pre-approved credit-card or loan.

The present invention recognises that piecing together data according to identity is an ambiguous problem, and allows the analysis to manage this ambiguity by choosing the level of confidence appropriate to the system rather than mistakenly assuming that all data can be unambiguously assigned to the correct customer.

In addition to the above, with the present invention, data records which are marked with a confidence parameter including an identified status indicator (Aldentified@) are further marked to include a particular upgrade rule associated therewith depending on the confidence in the identity of the external agent which produced the potential event of interest. The upgrade rules allocated are:—

Rule 1. If a potential event of interest is occurring in an interaction session after an Authentication Event has occurred, but before a De-Authentication Event has occurred, then the data records are marked as Identified with an Upgrade Rule of ANative@.

Rule 2. If a potential event of interest is occurring in the same interaction session as an Identification Event then it is marked as Identified with an Upgrade Rule of AIn Session@. One exception is when a De-Identification Event occurs in an interaction session but no subsequent Identification Event occurs within the same interaction session. In this case the rule does not apply to all of the data records that are produced from potential events of interest which occurred after the De-Identification Event in the interaction session.

Rule 3. If a potential event of interest occurring for the same Anonymous Profile ID turns out to be an Identification Event, then the data record produced is considered to be Identified with an Upgrade Rule of AIn And Around Session@. One exception is when a De-Identification Event occurs, but no subsequent Identification Event occurs for the same Anonymous ID. In this case this rule does not apply to all of the potential events of interest that occurred after the De-Identification Event in the interaction session.

Upgrade Rules are ordered in terms of restrictiveness. The order is from most restrictive to least restrictive: ANative@, AIn-Session@, AIn And Around Session@. If a data record is not marked with a confidence parameter including an identified status indicator, then it is marked with a confidence parameter including an anonymous status indicator (AAnonymous@).

If a data record is marked with a confidence parameter of AIdentified@, it is necessary to confirm which Identified Profile ID to associate the data record with. The following rules are used to determine this:—

If a data record is marked with an Upgrade Rule of ANative@ then the data record is assigned with the Profile ID representing the external agent that authenticated since in order to achieve an Upgrade Rule of ANative@ there must have been an Authentication Event.

If a data record has an Upgrade Rule of AIn Session@ or AIn And Around Session@, then the data record is assigned with the Profile ID represented by the most recent Identification Event, unless the most recent De-Identification Event is later than the most recent Identification Event, in which case the data record is assigned with the Profile ID represented by the preceding Identification Event (earliest Identification Event after the interaction event). If there has been no previous Identification Event, the data record is assigned with the Profile ID from the preceding Identification Event in this case.

Since there may be many potential events of interest associated with an Anonymous Profile ID before an Identification Event occurs (if one occurs at all), the data records of such events are stored in an Anonymous Event Store as mentioned above in exactly the same way as the Identified Event Stores which have potential events of interest assigned with an Identified Profile ID. However, when an Identification Event occurs it becomes necessary to move the data records for such potential events of interest from the Anonymous Events Store to an Identified Events Store.

In this respect, if an Identification Event occurs in an interaction session, then any data records produced from potential events of interest from previous interaction sessions (from the most recent De-Identification Event), which have been assigned with the same Anonymous Profile ID, are moved from the Anonymous Events Store to an Identified Events Store, and are associated with the relevant Identified Profile ID (and are marked with the appropriate Upgrade Rule of AIn And Around Session@).

The mapping between the Anonymous Profile ID and the Identified Profile ID is maintained or persisted so that potential events of interest occurring during subsequent interaction sessions for that Anonymous Profile ID can also be added to the Identified Event Store up until a De-Identification Event occurs, or an Identification Event occurs for a different Identified Profile ID. The motivation behind moving the storage of data records from the Anonymous Events Store to the Identified Events Store is to try and maintain as much parallelism as possible when making queries on the Event Stores.

If data records are not moved from the Anonymous Events Store to the Identified Events Store it would be necessary to query multiple Event Stores to build a profile scenario record for a single Identified Profile ID (combining various Anonymous "fragments" into a single Identified profile scenario record). Moving the data records and combining them under a single Profile ID enables querying of only a single Event Store.

In addition to the Anonymous Event Stores and Identified Event Stores there is the possibility of a further Event Store known as the Impure Anonymous Event Store. This stores all of the data records for each Anonymous Profile ID. While the Anonymous Event Store stores only "purely" anonymous data records of potential events of interest (in other words, data records for which there has never been an Identification Event, or data records which follows a De-Identification Event), the Impure Anonymous Event Store stores all data records associated with an Anonymous Profile ID whether there have been Identification Events or not.

The Impure Anonymous Event Store is used for assembling fragments of data together into an Identified profile scenario record, where the fragments may or may not represent the external agent associated with that scenario record. For example, if there are a set of potential events of interest in between two Identification Events for two different Identified Profile IDs, the potential events of interest may belong to the first Profile ID or they may belong to the second Profile ID. The Impure Anonymous Events Store associates the potential events of interest with both Profile IDs and possibly with different confidence parameters depending on various factors, such as their proximity to the Identification Events.

When executing a query against the stored data records, an Upgrade Rule can be specified as part of the overall Variable (as discussed below). In this case, the data records that satisfy the query must be at least as restrictive as the specified Upgrade Rule. It should be noted that this does not mean that all of the data records of a Profile ID must pass the Upgrade Rule, only those data records that contribute to the Profile ID passing the query criteria. This also applies to the data records that are aggregated together to form variables for the query.

For example, if the analytical query concerns the Total Spend Variable, only the data records that pass the Upgrade Rule could be specified as to contribute to the value of that Variable, for the purposes of filtering.

When a query is executed, as part of the variable of the query, a Scenario Record is built for each Profile ID where the confidence parameter satisfies the confidence interrogation parameter and contains a potential event of interest corresponding to said selected actual event of interest. The Variables in each record can be split up according to the "Identity Status" used to build the variable. The Identity Status can have three values: Anonymous, Weakly Identified, and Strongly Identified.

Variables associated with the Anonymous Identity Status are built from data records in the Anonymous Events Store only. Variables associated with the Strongly Identified Identity Status are built from data records having an identified status indicator and which have an Upgrade Rule that is at least as restrictive as the Upgrade Rule specified in the query (they have an Upgrade Rule that passes the query).

Variables associated with the Weakly Identified Identity Status are built from identified interaction events that have an Upgrade Rule that is less restrictive than the Upgrade Rule specified in the query (they have an Upgrade Rule that does not pass the query).

It should be noted that in the case that the identity of an external agent is learnt then it is possible for a data record to have two Profile Ids, associating the potential event of interest with both a Profile ID in an Anonymous Events Store and a Profile ID in an Identified Events Store.

As mentioned above, the present invention is widely applicable. In this respect, whilst the method of the present invention has been described to some degree in relation to humans (the external agents) interacting with the Internet (the system), the present invention can be widely applied to many systems. For example, the present invention could be applied to model behaviour of soldiers (the external agents) in a combat scenario (the system), the behaviour of drivers (the external agents) in a new traffic flow arrangement (the system) and so on.

It will be appreciated that the present invention is capable of considerable modification, the detailed embodiments of which will be readily apparent to those skilled in the art.

The invention claimed is:

1. A method of analyzing data records associated with events of interest that occur during monitored interactions between a plurality of individual external agents and a system, the method comprising:
   defining a plurality of specific interactions that occur between the plurality of individual external agents and the system as events of interest;
   producing, from a monitored chain of interactions occurring during respective interaction sessions between said individual external agent and the system a respective data record for each event of interest as it occurs in the chain, the data record including data identifying the event of interest and data associated therewith;
   assigning a profile identity to each said data record which is representative of the external agent involved in the interaction session together with a confidence parameter representative of the certainty of the identity of the external agent involved in the event of interest;
   storing data records of individual events of interest in a first store in a way that is ordered according to the type of event of interest and storing data records of events of interest occurring during an interaction session in a second store in a way that is physically ordered according to assigned profile identity;
   selecting a particular event of interest within the stored data and selecting a confidence interrogation parameter for the confidence parameter;
   querying and retrieving from the stored data records those data records where the confidence parameter satisfies the confidence interrogation parameter and contains an event of interest corresponding to said particular event of interest;
   constructing, from the retrieved data records, a scenario record relative to the particular event of interest which includes data of interactions associated therewith;
   wherein the confidence parameter includes an identified status indicator when an event of interest between a respective external agent and the system has occurred with an identified external agent or an anonymous status indicator when an event of interest between a respective external agent and the system has occurred with an unidentified external agent;
   wherein the second store includes an identified events store for storing data records having a confidence parameter including an identified status indicator and an anonymous events store for storing data records having a confidence parameter including an anonymous status indicator and the method further comprises transferring data records from the anonymous events store to the identified events store if the confidence parameter of the data records changes from an anonymous indicator to an identified indicator.

2. A method according to claim 1, wherein when the confidence parameter includes an identified status indicator, the confidence parameter further includes an upgrade rule representative of a degree of confidence in the identity of the external agent.

3. A method according to claim 2 wherein the upgrade rule comprises:
   a high upgrade potential if the external agent authenticates their identity;
   a medium upgrade potential if the external agent identifies their identity; and
   a low upgrade potential if the external agent occurs in an interaction session.

* * * * *